Jan. 23, 1968   D. N. G. METCALF   3,364,535
CLAMP-TYPE FASTENER
Filed Feb. 2, 1966
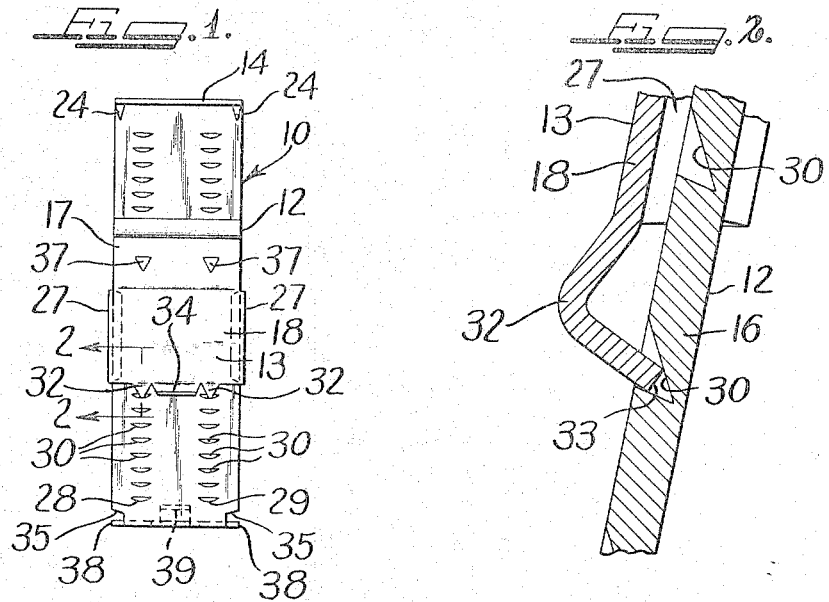
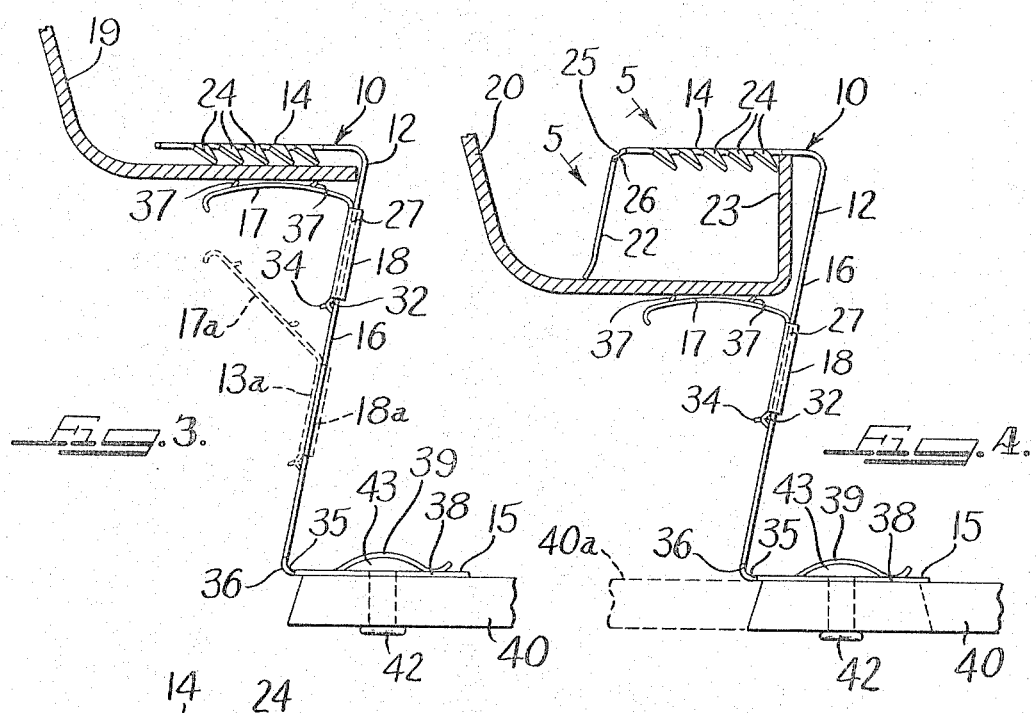
INVENTOR
DEREK N. G. METCALF
BY
Horton, Davis, Brewer & Brugman
Attys.

United States Patent Office 3,364,535
Patented Jan. 23, 1968

3,364,535
CLAMP-TYPE FASTENER
Derek N. G. Metcalf, La Grange Park, Ill., assignor to Athena Industries, Inc., La Grange, Ill., a corporation of Illinois
Filed Feb. 2, 1966, Ser. No. 524,537
8 Claims. (Cl. 24—263)

ABSTRACT OF THE DISCLOSURE

A clamp-type fastener by which an article may be mounted on supporting structures of different external sectional shapes and embodying linearly movable clamping elements having clamp arms in opposed relationship and adapted to releasable retention in a clamping position by a ratchet mechanism urged toward a locked position by force resulting from engagement of the clamp arms with the supporting structure, one of said clamp arms being resiliently flexible and normally extending angularly toward the other, and said other clamping arm having a removable angularly disposed end extension thereon for adapting the clamp arms to supporting engagement with different sectional shapes of the supporting structure.

This invention relates to clamp-type fasteners, and more particularly to fasteners embodying relatively movable clamping elements adapted to adjustment or variation of structure or both for gripping different types, shapes and sizes of supports.

One of the objects of this invention is to provide a clamp-type fastener having connected gripping parts which are linearly movable relative to one another and which releasably lock in a position in which force is exerted through the gripping parts.

Another object of the invention is to provide a clamp-type fastener wherein opposed and relatively movable gripping elements are resiliently flexible, as well as relatively movable toward and from one another and have engageable portions for releasably locking the gripping elements against movement from one another when the gripping elements are engaged with opposed surfaces of a gripped structure.

This invention further has within its purview the provision of a clamp-type fastener having opposed and relatively movable gripping elements, and wherein one of said gripping elements is scored for the breakage therefrom of an end element to adapt the gripping element for gripping engagement with different sectional shapes of objects.

As another object, this invention comprehends the provision of a clamp-type fastener embodying a combination of resiliently flexible and opposed gripping elements together with relatively slidable parts releasably retainable by lock means for effecting the general selection of the spacing between the gripping elements in respect to an object to be gripped.

It is another object of this invention to provide a clamp-type fastener having resiliently flexible gripping elements which are provided with prongs for enhancing the gripping ability of the elements.

The invention further has within its purview the provision of a clamp-type fastener which is adapted to use as a support bracket for the support of an item relative to structures of different sizes and shapes.

Other objects and advantages of my invention will be apparent from the following description and drawings of which:

FIG. 1 is a rear elevational view of a clamp-type fastener constituting a preferred embodiment of this invention;

FIG. 2 is a fragmentary side sectional view of a portion of the structure shown in FIG. 1 and wherein the scale is considerably larger than that used in FIG. 1, and also wherein the section is taken substantially as indicated by line 2—2 and accompanying arrows in FIG. 1;

FIG. 3 is a side elevational view of the clamp-type fastener shown in FIG. 1, and wherein elements supporting the fastener and supported thereby are shown fragmentarily;

FIG. 4 is a side elevational view of a fastener of the same general type embodying structure for facilitating its application to a different type of supporting structure than that shown in FIG. 3, the supporting and supported structural elements being shown fragmentarily; and FIG. 5 is a view taken substantially as indicated by a line 5—5 and accompanying arrows in FIG. 4.

In the exemplary embodiment of the invention which is shown in the accompanying drawings for illustrative purposes, a clamp-type fastener 10 has clamping elements 12 and 13 connected for linear movement relative to one another. The clamping element 12 is a generally Z-shaped structure, as viewed from the side, and as shown in FIGS. 3 and 4; and embodies a clamp arm portion 14, a projecting end portion 15 and an intermediate web portion 16 integrally formed from a metal strip, such as spring steel. The clamping element 13 has a clamp arm portion 17 and a connecting portion 18, which portions are normally in obtuse angular relationship to one another as shown at 17a and 18a in FIG. 3. The clamping element 13 is also made integrally from a strip of metal, such as spring steel, and, as herein depicted for the disclosed structure, the clamp arm portion 17 is desirably flexible and resilient, so that when a support structure, such as 19 in FIG. 3 and 20 in FIG. 4 is gripped between the clamp arm portions 14 and 17, the clamp arm portion 17 may flex toward parallelism with the clamp arm portion 14 to enhance the gripping action and afford forces resistant to slippage and loosening.

When the clamp-type fastener of this invention is made for use in which it may be supported by structures of different sectional shapes, such as 19 and 20 in FIGS. 3 and 4, it is initially produced in the form shown in FIGS. 4 and 5, wherein the clamp arm portion 14 has an integral end extension 22 thereon which projects angularly from the end of the clamp arm portion 14 remote from the intermediate web portion 16. As an example, clamp-type fasteners of the type illustrated herein may be used for supporting an item, such as a waste bag, from the lower surface of a dashboard of an automobile. Since there is no standardization and the dashboard structures of different makes of cars vary widely, a fastener suited to use on a variety of the different supporting structures should be suited to variations which are adapted to firm gripping action relative to those supporting structures.

The clamp-type fastener shown in FIG. 4, and which includes the extension 22 on the clamp arm portion 14, is well adapted to use on a supporting structure 20, such as an automobile dashboard, which has a flange 23 extending upwardly along its rear edge. As a further aid to the gripping and retention of the fastener relative to any of various types of structures, rows of teeth 24 are integrally formed along the opposite side margins of the clamp arm portion 14, which teeth are desirably triangular in shape having sharp projecting edges and extend downwardly in angular relationship to the general plane of the clamp arm portion 14. As herein disclosed, the teeth slope laterally outwardly and downwardly, as well as being pointed forwardly toward the web portion 16 of the clamping element. Thus, as shown in FIG. 4, the extension 22 stabilizes the fastener relative to the support structure by the engagement of the end of the extension 22 with the surfaces of the supporting structure at a position spaced from the flange 23. Also, at least a pair of the teeth 24 are adapted to engage the inner surface of the flange 23 to prevent slippage of the fastener away from the supporting structure.

In order to make a clamp-type fastener of the type shown in FIG. 4 better adaptable to mounting on other forms of supporting structures, a weakened section is provided between the clamp arm portion 14 and the extension 22 by the provision of a scored line 25 extending across the clamp arm portion 14 between opposed side notches 26 at the curved juncture between the clamp arm portion 14 and the extension 22, as shown in FIGS. 4 and 5. As a result of the provision of means establishing a weakened section between the clamp arm portion 14 and its extension 22, the extension 22 may be readily severed from the clamp arm portion 14 by flexure along the scored line 26 while, for example, the structural portions on opposite sides of the scored line are gripped with the aid of tools such as pliers.

When extension 22 is removed, the clamping element 12 is in the form shown in FIG. 3, and is adapted to the gripping of surfaces which are more or less flat, and which may vary considerably in thickness. The connecting portion 18 of the clamping element 13 has opposed side flange portions 27 which are bent to engage the side edges and marginal surface portions of the web portion 16 of the clamping element 12 to hold the clamping elements in assembled relationship and to support the clamping element 13 for sliding movement along web portion 16 of the clamping element 12. Such sliding movement of the clamping element 13 along the web portion 16 of the clamping element 12 moves opposed gripping surfaces of the clamp arm portions 14 and 17 toward and from one another, whereby a supporting structure may be gripped therebetween. In order to maintain the clamp arm portions 14 and 17 in gripping relationship relative to opposed surfaces of the supporting structure, means is provided in the disclosed structure for maintaining the clamping element 13 in a fixed position relative to the web portion 16 of the clamping element 12.

In the disclosed structure, rows 28 and 29 of recesses 30 extend longitudinally of opposite side regions of the web portion 16 of the clamping element 12 which faces toward the direction of projection of the clamp arm portion 14 of that clamping element. Each row of recesses serves as a ratchet.

For coaction with the rows 28 and 29 of recesses 30, projecting tongues 32 are provided on the clamping element 13. As shown in FIGS. 1 and 2, the projecting tongues 32 project from the edge of the connecting portion 18 of the clamping element 13 opposite the edge from which the clamp arm portion 17 projects and are integral with the connecting portion 18, as well as being spaced laterally for alignment with the rows 28 and 29 of recesses. The tongues 32 are bent, as shown in FIG. 2 and are generally triangular in shape with relatively sharp projecting ends 33 adapted to engage firmly in the recesses to act as pawls for normally preventing movements of the clamping element 13 along the web portion 16 of the clamping element 12 away from the clamp arm portion 14. A curved flange 34 which is integral with the connecting portion 18 of the clamping element 13 is provided between the projecting tongues 32 to extend away from the web portion 16 of the clamping element 12, so as to provide a convenient place for the insertion of a tool, such as a wedge-shape blade, between the flange 34 and the mid-portion of the web portion 16 to lift the connecting portion 18 away from the web portion 16, thereby to effect disengagement of the tongues 32 from the recesses 30 in which they are engaged when the release of the clamping element 13 is desired.

Since the formation of the side flange portions 27 on the connecting portion 18 of the clamping element 13 may provide space for a slight amount of lateral movement between the clamping elements 12 and 13, that looseness of fit is not only useful for effecting release of the tongues 32 from their respective recesses 30 by manually inserting a wedge-shape blade between the web portion 16 and the connecting portion 18, as aforementioned, but it may also be noted that it affords some space for movement of the connecting portion to urge the tongues 32 toward engagement with the recesses 30 as a result of clamping pressure exerted against the clamp arm portion 17 by a structure to which the fastener is attached. That is, the clamp arm portion 17 projects laterally from the connecting portion 18 and therefore acts as a lever which tends to turn the connecting portion 18 relative to the web portion 16 in a direction which urges the tongues 32 into the recesses 30. The tighter the supporting structure 20 is gripped between the clamp arm portions 14 and 17, the more firmly the tongues 32 are held in engagement in the recesses 30.

Notches 35 are provided at a bend 36 at the lower end of the web portion 16 of the clamping element 12, at which bend, the end portion 15 is adjoined to the lower end of the web 16. The notches 35 provide space through which the side flange portions 27 pass when the clamping element 13 is assembled with respect to the web portion 16 of the clamping element 12. Prongs 37 are integrally formed on the clamp arm portion 17 of the clamping element 13, which prongs are generally triangular in shape and present sharp ends projecting toward the opposed surface of the clamp arm portion 14 and also slope somewhat toward the web portion 16 of the clamping element 12. The prongs 37 complement the actions of the teeth 24 on the clamping element 14 and engage an opposed surface of the supporting structure to resist slippage or loosening of the fastener when a supporting structure is gripped.

The normal obtuse angular relationship between the clamp arm portion 17 and its connecting portion 18 and the resilient flexibility of the clamp arm portion 17 not only keep a holding force exerted against a gripped supporting structure, but also provide for firm gripping action on any supporting structure by affording a compensation for the spaces between the recesses 30 which determine the fixed positions of the connecting portion 18 along the web portion 16.

Although it is understood that various types or kinds of end portions could be provided on a fastener having the other characteristics disclosed herein for supporting various items or loads with the aid of the fastener, the end portion 15 has two spaced and substantially parallel side fingers 38 which are generally straight and coplanar. Between the side fingers 38, and integrally formed therewith, a central curved finger 39 is provided. In the disclosed structure, a supported element 40 has a rivet 42 extending therethrough. Space is provided between the head 43 of the rivet and the supported element 40 for sliding engagement with the side fingers 38. The curved finger 39 is resilient and snaps over the head of the rivet to retain the supported element in place. As shown in FIG. 4, the supported element may be swung relative to the fastener to various positions including that indicated at 40a.

From the foregoing description and by reference to the accompanying drawings, it may be understood that the disclosed structure provides a clamp-type fastener which may be readily produced in production quantities at low cost and which provides many variations of both the structural detail and clamping action to effect firm and effective engagement with supporting structures of various types and shapes and which may vary considerably in dimensional characteristics. Inasmuch as the clamping elements are releasably located and resiliently biased in a firm load gripping relationship when in use, the fastener is also susceptible to ready removal when desired.

It is thus understood that the foregoing description is merely illustrative of further embodiments of this invention and that the scope of this invention is not to be limited thereto, but is to be determined by the appended claims.

I claim:

1. A clamp-type fastener comprising, in combination, a generally Z-shaped clamping element having a substantially straight intermediate web portion connecting oppositely projecting end portions, one of said end portions serving as a first clamp arm, the other of said end portions serving as a support for an item to be supported by the fastener, a second clamping element having portions in angular relationship to one another, one of said portions of the second clamping element including opposed side flange means bent toward one another to embrace opposite edges of said web of the Z-shaped clamping element for connecting the second clamping element to the intermediate web of the Z-shaped clamping element for sliding movements therealong between said projecting end portions, the other of said portions of the second clamping element being resiliently flexible and serving as a second clamp arm projecting outwardly and normally at an angle toward said first clamp arm from the same side of the intermediate web of the Z-shaped clamping element as the first clamp arm, said clamp arms having surfaces with integral teeth thereon in opposed relationship to one another for the gripping of surfaces of a supporting structure therebetween, and means including a projecting tongue on said one of the portions of the second clamping element in spaced relationship to said second clamp arm and having an edge engageable in recesses in the web of the Z-shaped clamping element in response to gripping forces against the supporting structure therebetween for releasably holding the second clamping element in a fixed position relative to the intermediate web of the Z-shaped clamping element.

2. A clamp-type fastener as defined in claim 1, and wherein said first clamp arm has an end extension thereon projecting in angular relationship thereto and in spaced and opposed relationship to said intermediate web.

3. A clamp-type fastener as defined in claim 2, and wherein a section between said first clamp arm and said end extension is weakened, so that said end extension is severable from the first clamp arm, whereby said clamp arms are adapted to grip different shapes of supporting structures.

4. In a clamp-type fastener adapted to grip structures of different thicknesses and sectional shapes, the combination comprising two relatively movable clamping elements which each have clamp arm and connecting portions in angular relationship to one another, said clamp arm portions of the clamping elements having surfaces in opposed relationship to one another, means on one of said connecting portions for holding surfaces of the said connecting portions in adjacent relationship to one another and providing a sliding connection therebetween for varying the space between said clamp arm portions, ratchet means on one of said adjacent surfaces of the connecting portions and extending longitudinally thereof, pawl means on the other connecting portion aligned for engagement with said ratchet means and urged into engagement therewith by clamping pressure exerted between and against said opposed surfaces of the clamp arms, said ratchet means comprising a row of depressions integrally formed in the connecting portion of one of clamping elements, and said pawl means comprising a curved projecting tongue formed integrally with the end of the connecting portion of one of the clamping elements opposite the clamp arm portion thereof, the said curved projecting tongue terminating in a sharp edge which frictionally engages an inclined surface of an associated ratchet means depression to firmly lock the clamp arm portion against an object positioned therebetween.

5. In a clamp-type fastener as defined in claim 4, one of said clamp arm portions being resilient so that disengagement of said pawl means from the ratchet means can be effected by lifting the pawl means away from the ratchet means against the biasing force of the resilient arm portion.

6. In a clamp-type fastener as defined in claim 4, the clamp arm portion of one of said clamping elements being resilient and flexible and normally extending angularly toward the other clamp arm portion so that clamping pressure exerted between and against said opposed surface of the clamp arm portions flexes the resilient clamp arm portion in a direction such that the clamp arm portions approach parallelism.

7. In a clamp-type fastener as defined in claim 4, one of said clamp arm portions having an extension thereon at the end thereof remote from the connection portion and extending in generally parallel relationship to the connecting portion and generally toward the other clamp arm portion for use in effecting gripping engagement of the clamp arm portions with flanged supporting structures.

8. In a clamp-type fastener as defined in claim 7, there being a structurally weakened area provided between said one of the clamp arm portions and the said extension thereon at which breakage may be effected for removing the extension from the clamp arm portion when supporting structures having relatively flat surfaces are to be gripped between the clamp arm portions.

References Cited

UNITED STATES PATENTS

| | | |
|---|---|---|
| 1,586,244 | 5/1926 | Hermann. |
| 1,647,008 | 10/1927 | Lawrence. |
| 1,653,465 | 12/1927 | Montan et al. |
| 1,762,311 | 6/1930 | Schwab. |
| 1,856,847 | 5/1932 | Gates. |
| 2,040,750 | 5/1936 | Long _____ 24—81 XR |
| 3,019,954 | 2/1962 | Paltin. |

FOREIGN PATENTS

| | | |
|---|---|---|
| 161,277 | 7/1933 | Switzerland. |
| 1,190,285 | 4/1965 | Germany. |
| 387,438 | 5/1965 | Switzerland. |

DONALD A. GRIFFIN, *Primary Examiner.*